May 3, 1955 F. R. SIEMINSKI Re. 23,996
COLLAPSIBLE WALL TABLE
Original Filed July 26, 1951
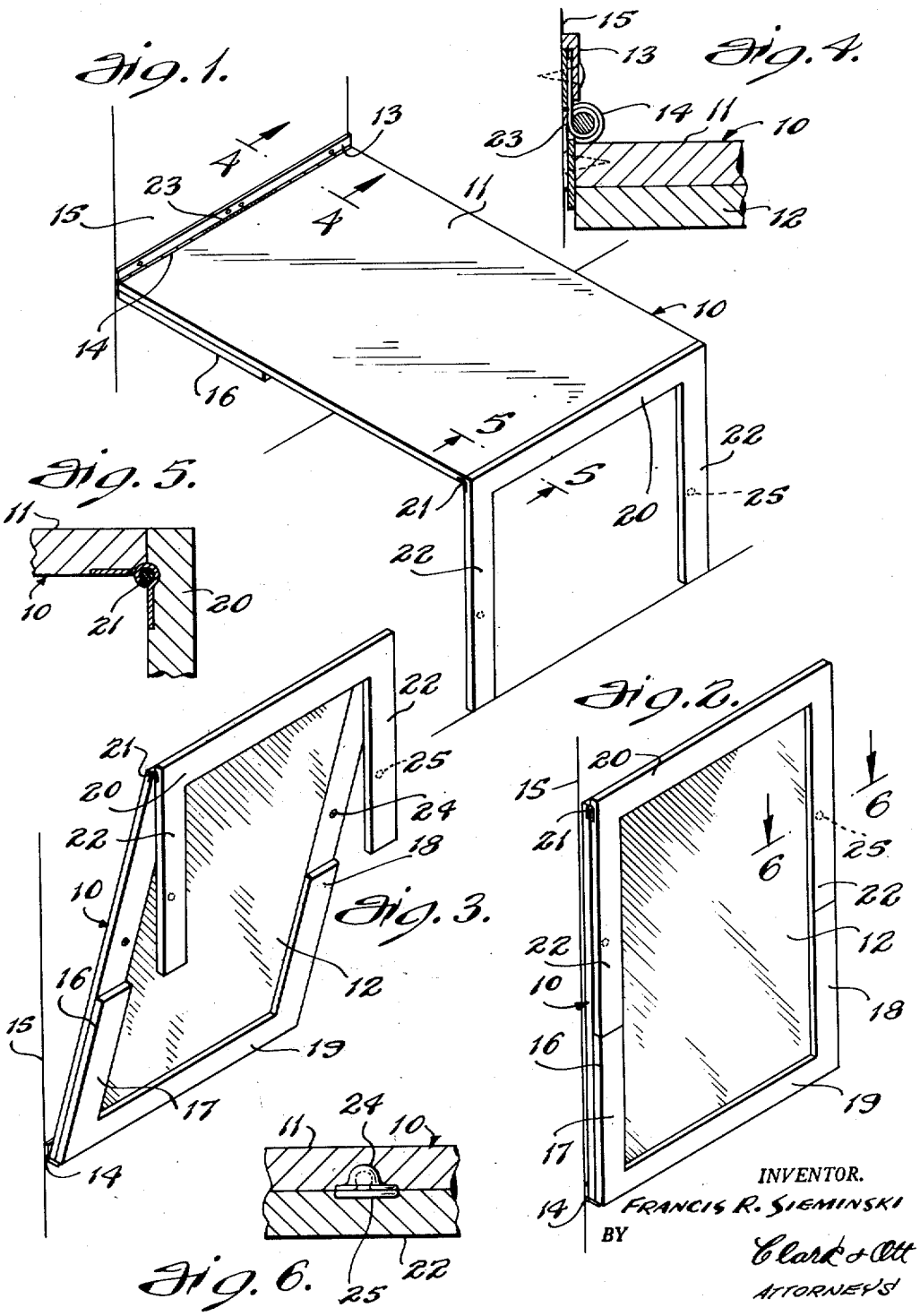

United States Patent Office

Re. 23,996
Reissued May 3, 1955

23,996

COLLAPSIBLE WALL TABLE

Francis R. Sieminski, New York, N. Y.

Original No. 2,650,145, dated August 25, 1953, Serial No. 238,693, July 26, 1951. Application for reissue November 29, 1954, Serial No. 471,933

2 Claims. (Cl. 311—3)

Matter enclosed in heavy brackets [ ] appears in the original patent but forms no part of this reissue specification; matter printed in italics indicates the additions made by reissue.

This invention relates to articles of furniture and has particular reference to an article of furniture which is adapted to form a table when disposed in one position and as an ornament for the wall when arranged in another position.

An object of the invention is to provide an article of furniture which includes a member having a plane upper face and an ornament affixed to the lower face thereof and which member is hinged to *an upright supporting structure such as* the wall of a room for swinging movement from upright relation for displaying the ornament to horizontal relation for use as a table.

Still another object of the invention is to provide an article of furniture of said character in which the ornament has a border frame which is divided medially thereof with the outer end of the frame hingedly connected with the member to form legs therefor when the same is disposed in a horizontal position.

Still another object of the invention is to provide means for releasably connecting opposite parts of the border frame together when in vertical relation.

With the foregoing and other objects in view, reference is now made to the following specification and accompanying drawings in which the preferred embodiment of the invention is illustrated.

In the drawings:

Fig. 1 is a perspective view of an article of furniture constructed in accordance with the invention and showing the same disposed in table forming relation.

Fig. 2 is a perspective view of the article of furniture showing the same in elevated relation to display the ornament.

Fig. 3 is a similar view showing the article of furniture in partially elevated relation.

Fig. 4 is an enlarged vertical sectional view taken approximately on line 4—4 of Fig. 1.

Fig. 5 is a similar view taken approximately on line 5—5 of Fig. 1.

Fig. 6 is a horizontal view taken approximately on line 6—6 of Fig. 2.

Referring to the drawings by characters of reference, the article of furniture includes a member 10 which is preferably of rectangular formation having a plane upper face 11 and which is provided with an ornamental article 12 secured to the under side thereof. The member 10 is hingedly connected with a strip 13 at one end thereof by a hinge 14 so as to dispose the strip 13 in position to be connected with *an upright supporting structure such as* a wall indicated by the reference character 15 of a room for swinging movement of the article of furniture from upright relation for displaying the article to a horizontal position for use as a table.

The ornamental article 12 may be a mirror, picture or the like and the same is secured to the under side of the member 10 by a frame 16 extending about the border thereof. The longitudinally extending sides 17 and 18 of the frame are severed intermediate their length to provide oppositely disposed mating frame sections 19 and 20. The inner section 19 is permanently affixed to the member 10 while the outer section 20 is hingedly connected thereto by a hinge 21 for movement of said outer section for mating relation with the inner section when the article is in upright relation to a depending relation to provide legs 22 for supporting the member 10 when in table forming relation.

The hinge 14 is provided with a coiled spring 23 which is tensioned against the member 10 so as to normally urge the same upwardly from the horizontal position to the upwardly extending relation and which will retain the member 10 in upwardly extending relation adjacent the wall as illustrated in Fig. 2 of the drawings without the need of additional securing means. Thus when the table is to be moved to upwardly extending relation the same is manually moved to a position beyond an angle of 45° with the *upright supporting structure or* side wall 15 whereupon the spring 23 will function to move the member 10 into adjacent relation with the *upright supporting structure or* wall and to retain the same in the upright relation to display the ornamental articles.

The legs 22 will swing into closed relation with the under side of the member 10 when the same is moved to upright relation and interengageable fastening means such as socket and stud 24 and 25 are provided on the under side of the member 10 and on the inner faces of the legs 22 for releasably securing the legs in position against the under side of the member 10.

While the preferred form of the invention has been described and illustrated herein, it is to be understood that the same is not so limited and the invention covers all forms which fall within the purview thereof.

What is claimed is:

*1.* In a device of the character described, a flat supporting member providing a table top, a cleat secured to a side wall of a room and hingedly connected to one side of said supporting member for disposing said supporting member in horizontal table forming relation and in an upright out-of-the-way position adjacent said wall, a border frame consisting of oppositely disposed U-shaped sections, one of said sections being secured to the under side of said supporting member along the border at the inner end thereof and the other of said sections being hingedly connected to said supporting member at the outer end thereof and adapted to swing to dispose the opposite sides of said U-shaped member in depending relation to form legs for supporting the outer end of said supporting member when the same is disposed in table forming relation, said legs and supporting member having interengageable means for securing said last mentioned U-shaped member in engagement against the supporting member when the said supporting member is swung to upright relation on its hinge connection, and a spring arranged at the pivotal connection of said supporting member with said cleat to thereby resiliently maintain the supporting member in upwardly extending relation.

*2. In a device of the character described, a flat member providing a table top, an upright supporting structure, said table top being hingedly connected to the supporting structure for disposing said table top in horizontal table forming relation and in an upright out-of-way position, a border frame consisting of oppositely disposed* U-*shaped sections one of said sections being secured to the under side of said table top along the border at the inner end thereof and the other of said sections being hingedly connected to said table top at the outer end thereof and adapted to swing to dispose the opposite sides of said*

*U-shaped member in depending relation to form legs for supporting the outer end of said table top when the same is disposed in table forming relation, said legs and table top having interengageable means for securing said last mentioned U-shaped member in engagement against the table top when the said table top is swung to upright relation on its hinge connection, and means connected with said table top at the pivotal connection of said table top with said supporting structure to thereby normally urge the table top into upwardly extending relation.*

References Cited in the file of this patent or the original patent

UNITED STATES PATENTS

| | | |
|---|---|---|
| 279,290 | Wulbeke | June 12, 1883 |
| 609,669 | Greenleaf et al. | Aug. 23, 1898 |
| 1,610,956 | Lannom | Dec. 14, 1926 |
| 1,632,268 | Berry | June 14, 1927 |
| 1,675,953 | Nichol | June 3, 1928 |
| 2,257,425 | Mezzetti | Sept. 30, 1941 |
| 2,531,233 | Pettit | Nov. 21, 1950 |